(12) United States Patent
Schlepple et al.

(10) Patent No.: US 12,066,663 B2
(45) Date of Patent: Aug. 20, 2024

(54) OPTO-ELECTRICAL FLEXIBLE GLASS INTERPOSER

(71) Applicant: Cisco Technology, Inc., San Jose, CA (US)

(72) Inventors: Norbert Schlepple, Macungie, PA (US); Vipulkumar K. Patel, Breinigsville, PA (US); Weizhuo Li, Berkeley Heights, NJ (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/650,601

(22) Filed: Feb. 10, 2022

(65) Prior Publication Data
US 2023/0251427 A1   Aug. 10, 2023

(51) Int. Cl.
| | | |
|---|---|---|
| G02B 6/30 | (2006.01) | |
| G02B 6/36 | (2006.01) | |
| G02B 6/38 | (2006.01) | |
| G02B 6/43 | (2006.01) | |

(52) U.S. Cl.
CPC ............ *G02B 6/30* (2013.01); *G02B 6/3608* (2013.01); *G02B 6/3885* (2013.01); *G02B 6/43* (2013.01)

(58) Field of Classification Search
CPC ...... G02B 6/30; G02B 6/3608; G02B 6/3885; G02B 6/43
See application file for complete search history.

(56) References Cited

U.S. PATENT DOCUMENTS

| | | |
|---|---|---|
| 2012/0189244 A1 | 7/2012 | Bowen et al. |
| 2014/0161385 A1 | 6/2014 | Lessard et al. |
| 2016/0131837 A1 | 5/2016 | Mahgerefteh et al. |
| 2018/0217326 A1* | 8/2018 | Brusberg ............... G02B 6/30 |
| 2019/0324201 A1 | 10/2019 | Celo et al. |
| 2019/0391350 A1 | 12/2019 | Evans et al. |
| 2021/0173160 A1 | 6/2021 | Patra et al. |
| 2022/0342219 A1* | 10/2022 | Sung ................... G02B 6/1221 |

OTHER PUBLICATIONS

Sheng Huang, Mingshan Li, Sean M. Garner, Ming-Jun Li, and Kevin P. Chen, "Flexible photonic components in glass substrates," Opt. Express 23, 22532-22543 (2015).

* cited by examiner

*Primary Examiner* — Michael P Mooney
(74) *Attorney, Agent, or Firm* — Patterson + Sheridan, LLP

(57) ABSTRACT

An apparatus includes a ribbon, an optical waveguide, and an IC. The ribbon includes a first end. The optical waveguide is disposed within the ribbon and terminates at the first end. The IC includes a curved surface. The first end of the ribbon bends to mate with the curved surface such that the optical waveguide is optically coupled to a corresponding waveguide in the IC.

18 Claims, 6 Drawing Sheets

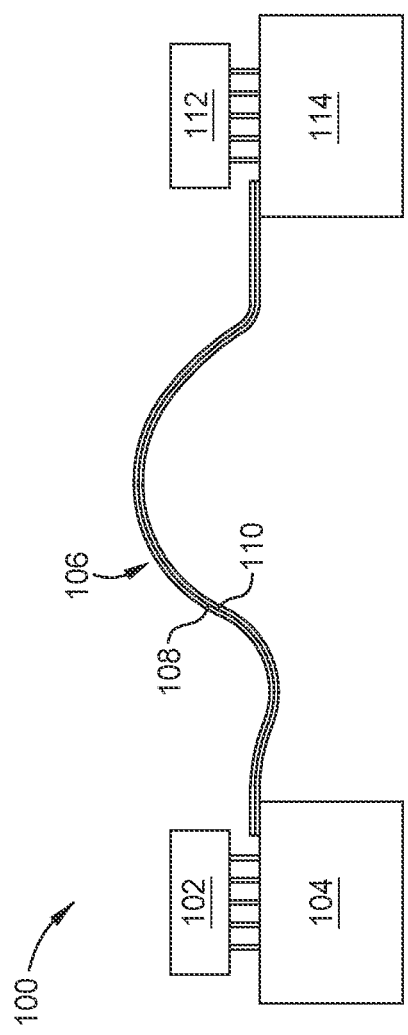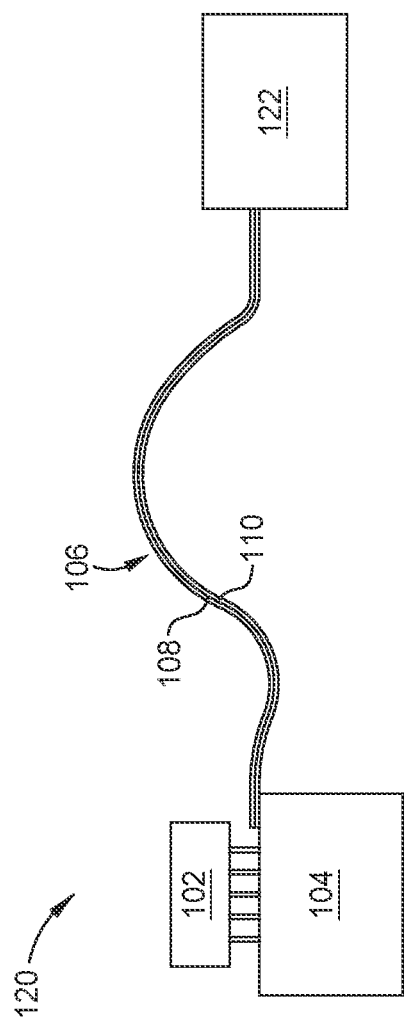

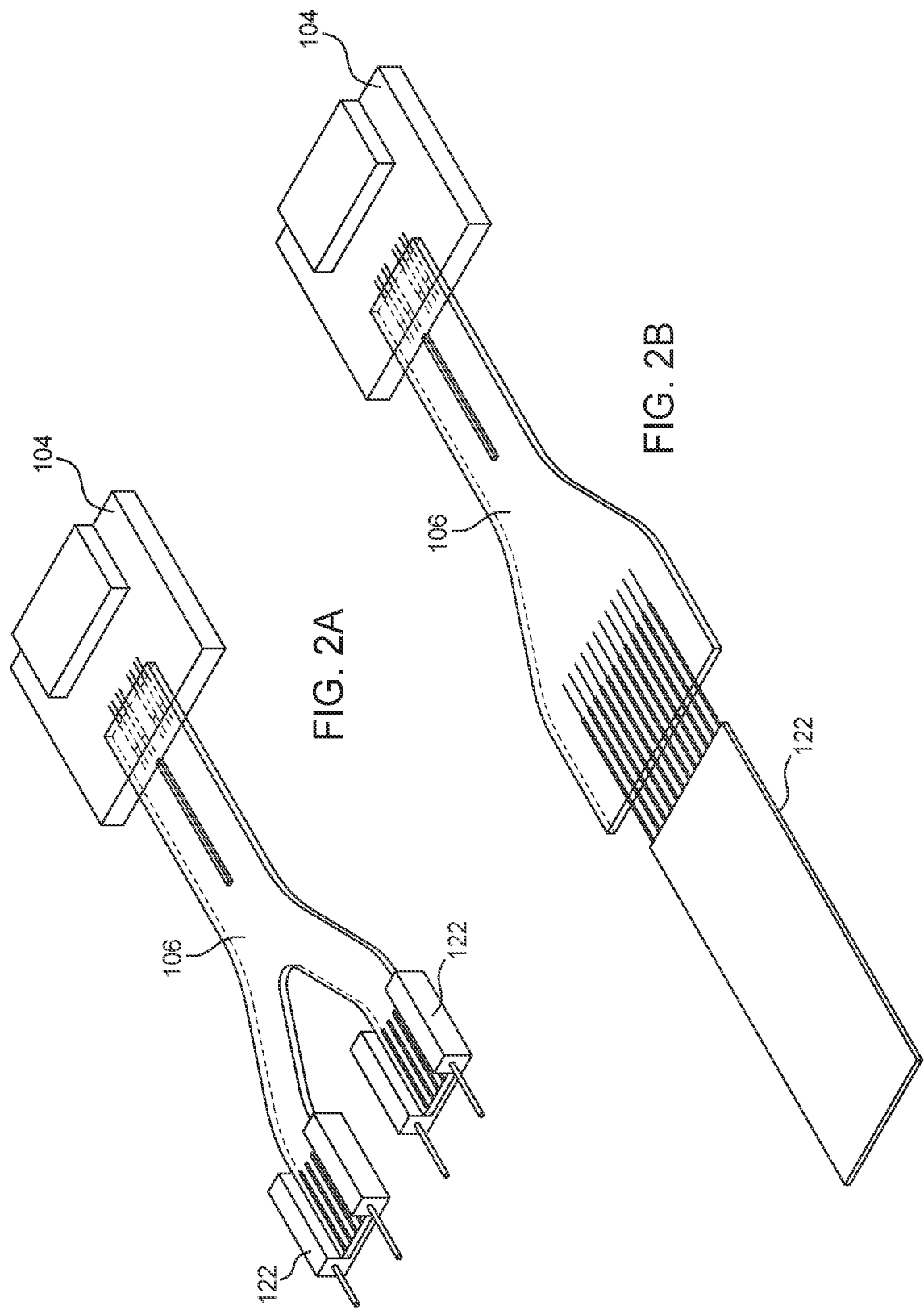

OPTO-ELECTRICAL FLEXIBLE GLASS INTERPOSER

TECHNICAL FIELD

Embodiments presented in this disclosure generally relate to optical communications. More specifically, embodiments disclosed herein a flexible glass interposer for optical waveguides.

BACKGROUND

Data rates are increasing and putting demand on input/output bandwidth. As data rates increase, the limitations of using copper to carry high speed data over long distances is becoming apparent. Optics has progressively eliminated copper in metro and long-haul networks, and optics is expected to replace copper for even shorter distances.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIG. 1A illustrates an example system.
FIG. 1B illustrates an example system.
FIG. 2A illustrates an example interposer.
FIG. 2B illustrates an example interposer.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 2C:
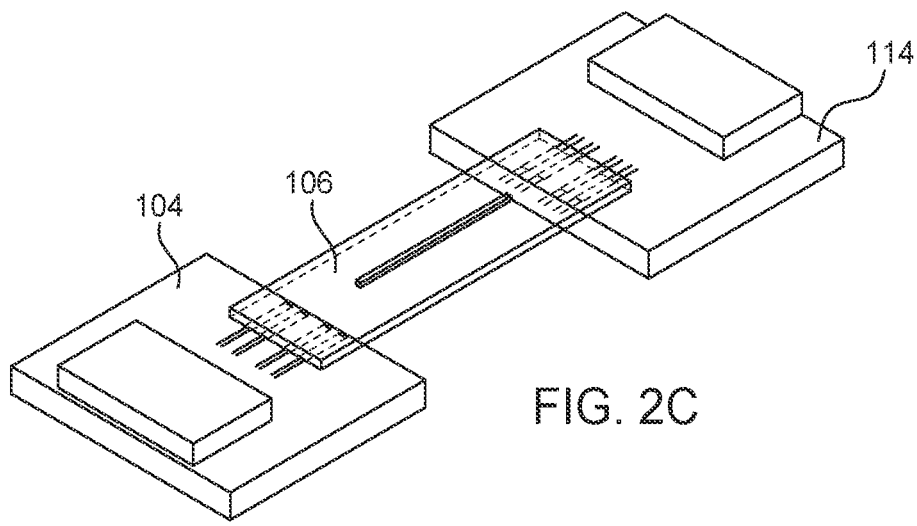
FIG. 2C illustrates an example interposer.

According to an embodiment, an apparatus includes a ribbon, an optical waveguide, and an integrated circuit (IC). The ribbon includes a first end. The optical waveguide is disposed within the ribbon and terminates at the first end. The IC includes a curved surface. The first end of the ribbon bends to mate with the curved surface such that the optical waveguide is optically coupled to a corresponding waveguide in the IC.

According to another embodiment, an apparatus includes a flexible glass ribbon, an optical waveguide, an IC, and a connector. The flexible glass ribbon includes a first end and a second end opposite the first end. The optical waveguide is disposed within the flexible glass ribbon and terminates at the first end. The IC includes a curved surface. The first end of the flexible glass ribbon bends to mate with the curved surface such that the optical waveguide is optically coupled to the IC. The connector is coupled to the second end of the flexible glass ribbon. The optical waveguide extends into the connector.

According to another embodiment, a system includes a flexible glass ribbon, an optical waveguide, a first photonic IC, and a second photonic IC. The flexible glass ribbon includes a first end and a second end opposite the first end. The optical waveguide is disposed within the flexible glass ribbon and terminates at the first end and at the second end. The first photonic IC includes a first curved surface. The first end of the flexible glass ribbon bends to mate with the first curved surface such that the optical waveguide is optically coupled to the first IC. The second photonic IC includes a second curved surface. The second end of the flexible glass ribbon bends to mate with the second curved surface such that the optical waveguide is optically coupled to the second IC.

EXAMPLE EMBODIMENTS

Optics has progressively eliminated copper in metro and long-haul networks, and optics is expected to replace copper for even shorter distances. There are several challenges to adopting optics for short distance applications (e.g., chip-to-chip communication). For example, it is difficult to manage the optical waveguides to properly couple (e.g., align) light in and out of a photonic integrated circuit (IC), especially when the photonic IC has surface warpage or deformities.

This disclosure contemplates a photonic interposer that includes an optical waveguide disposed within a flexible glass ribbon. The ribbon may deform to couple more closely with a photonic IC with surface warpage or deformities caused by a manufacturing process. The ribbon may include connectors at an end of the ribbon that help mate the ribbon and the waveguide to a connector or another device. As a result, the ribbon allows an optical waveguide to be properly aligned with a photonic IC when the photonic IC has surface warpage or deformities. Moreover, an electrical conductor may also be disposed in the ribbon, which allows an electrical connection to be formed with a photonic IC through the ribbon. In some embodiments, the interposer provides extreme waveguide fan-in towards the photonic IC and much larger channel density than what could be achieved with conventional optical fibers. The interposer also provides two-dimensional (2D) to one-dimensional (1D) translation within the fan-in to couple 2D multi-core fibers (MCFs) to a 1D photonic IC interface.

FIG. 1A illustrates an example system 100. As seen in FIG. 1A, the system 100 includes an electric IC 102, a photonic IC 104, an interposer 106 that includes an electrical conductor 108 and an optical waveguide 110, an electrical IC 112, and a photonic IC 114. Generally, the interposer 106 includes a flexible glass ribbon, and the optical waveguide 110 is disposed in the flexible glass ribbon. The flexible glass ribbon allows the interposer 106 to mate or couple to the photonic ICs 104 and 114, even if the photonic ICs 104 and 114 have surface warpages or deformities. As a result, the interposer 106 properly aligns the optical waveguide 110 with the photonic ICs 104 and 114, in particular embodiments.

The electrical ICs 102 and 112 process electrical signals from the photonic ICs 104 and 114 to perform particular functions. The electrical ICs 102 and 112 are connected to the photonic ICs 104 and 114, respectively, and the electrical ICs 102 and 112 receive electrical signals over that connection. Additionally, the electric ICs 102 and 112 may communicate electric signals to the photonic ICs 104 and 114 over the connection.

The photonic ICs 104 and 114 receive optical signals from the interposer 106. For example, the photonic IC 114 may communicate optical signals to the photonic IC 104 over the interposer 106. The photonic ICs 104 and 114 convert the optical signals into electric signals. The photonic ICs 104 and 114 then communicate the electric signals to the electric ICs 102 and 112 over the connection with the electric ICs 102 and 112. The photonic ICs 104 and 114 may also receive electric signals from the electric ICs 102 and 112 and convert those electric signals to optical signals. The photonic ICs 104 and 114 then communicate the optical signals over the interposer 106.

The interposer 106 communicates signals between the photonic ICs 104 and 114. The interposer 106 includes a flexible glass ribbon that bends or elastically deforms to mate or couple with the photonic ICs 104 and 114. The electrical conductor 108 and the optical waveguide 110 are disposed in or on the flexible glass ribbon. For example, the optical waveguide 110 may be disposed in the flexible glass ribbon, and the electrical conductor 108 may be disposed in and on the flexible glass ribbon. The optical waveguide 110 carries optical signals between the photonic ICs 104 and 114. The electrical conductor 108 carries electrical signals between the photonic ICs 104 and 114. As a result, the interposer 106 may form both an optical connection and an electrical connection with the photonic ICs 104 and 114.

The interposer 106 includes a flexible glass ribbon. The electrical conductor 108 and the optical waveguide 110 may be disposed in or on the flexible glass ribbon. The optical waveguide 110 may be laser patterned into the flexible glass ribbon. In some embodiments, the optical waveguide 110 may have a dense pitch (e.g., around a 25 micrometer pitch) near the interface with the photonic IC. The flexible glass ribbon may have a thickness around 200 micrometers that complies with the topologies of many photonic ICs. The flexible glass ribbon may terminate in a connector, a fiber ribbon, or at a photonic IC.

The flexible glass ribbon bends or elastically deforms to mate or couple with the photonic IC 104. Because the interposer 106 can form a closer mating or coupling with the photonic IC 104, the interposer 106 may properly align the optical waveguide 110 with the photonic IC 104 (e.g., so that the optical waveguide 110 optically couples with a corresponding waveguide in the photonic IC 104), even if the photonic IC 104 includes surface warpages or deformities that create curves in the surface of the photonic IC 104, in certain embodiments. These warpages may create excess loss in addition to the intrinsic coupling losses stemming from fiber spot size converter (SSC) mode mismatches, for example. By using the interposer 106, coupling loss may be reduced, in certain embodiments.

The flexible glass ribbon may be formed from a flexible glass sheet or strip. The optical waveguide 110 may be written into the flexible glass ribbon using laser writing. Reel-to-reel manufacturing may also be used to scale up the manufacturing of the interposer 106.

An index matching fluid (e.g., optical epoxy) may be disposed between the flexible glass ribbon and the photonic ICs 104 and 114 to establish or strengthen the optical coupling. Channels in the flexible glass ribbon may assist with the flow of the index matching fluid when the index matching fluid is dispensed.

The electric conductor 108 may be disposed in and on the flexible glass ribbon. The electrical conductor 108 may be laminated on the top of the flexible glass ribbon 610. The electrical conductor 108 extends down through the flexible glass ribbon towards the photonic ICs 104 and 114. Through glass vias may be formed in the flexible glass ribbon. The electrical conductor 108 extends through the through glass vias towards the photonic ICs 104 and 114. The electrical conductor 108 connects to electrical contacts 606 and 614 on the photonic ICs 104 and 114. For example, the electrical conductor 108 may be soldered to the electrical contacts 606 and 614 using solder bumps.

In some embodiments, the interposer 106 does not include the electrical conductor 108. As a result, the interposer 106 includes a flexible glass ribbon with the optical waveguide 110 disposed in the flexible glass ribbon. The interposer 106 elastically deforms to mate or couple with the photonic ICs 104 and 114. The optical waveguide 110 then carries optical signals between the photonic ICs 104 and 114.

FIG. 1B illustrates an example system 120. As seen in FIG. 1B, the system 120 includes the electric IC 102, the photonic IC 104, the interposer 106, and a connector 122. Generally, the interposer 106 connects to the photonic IC 104 and the connector 122. The interposer 106 may carry optical signals and/or electric signals between the photonic IC 104 and the connector 122.

As discussed previously, the electric IC 102 processes electric signals from the photonic IC 104. Additionally, the electric IC 102 may communicate electric signals to the photonic IC 104. The photonic IC 104 may receive optical signals from the interposer 106 and convert those optical signals to electric signals. The photonic IC 104 then communicates the electric signals to the electric IC 102 over the connection between the electric IC 102 and the photonic IC 104. The photonic IC 104 may also receive electric signals from the electric IC 102 over the connection between the electric IC 102 and the photonic IC 104. The photonic IC 104 then converts those electric signals to optical signals and communicates the optical signals to the connector 122 over the interposer 106.

The interposer 106 includes a flexible glass ribbon. The electrical conductor 108 and the optical waveguide 110 may be disposed in or on the flexible glass ribbon. The flexible glass ribbon elastically deforms to mate or couple with the photonic IC 104. Because the interposer 106 can form a closer mating or coupling with the photonic IC 104, the interposer 106 may properly align the optical waveguide 110 with the photonic IC 104 (e.g., so that the optical waveguide 110 optically couples with a corresponding waveguide in the photonic IC 104), even if the photonic IC 104 includes surface warpages or deformities, in certain embodiments.

The connector 122 is attached to the interposer 106. The connector 122 may be shaped or arranged to form any suitable type of connection with other electrical components. For example, the connector 122 may include ribbons and/or pins that allow the connector 122 to form a physical connection with another device. As a result, the connector 122 carries electrical and/or optical signals between the interposer 106 and other devices.

FIG. 2A illustrates an example interposer 106. As seen in FIG. 2A, the interposer 106 is connected to the photonic IC 104 at one end of the interposer 106. One or more connectors 122 are connected to the interposer 106 at the opposite end of the interposer 106. The connectors 122 include pins that align the connectors 122 with another device. In the example of FIG. 2A, the end of the interposer 106 with the one or more connectors 122 may split or divide into separate branches that connect to the different connectors 122. As a result, the interposer 106 carries signals between the photonic IC 104 and the one or more connectors 122. The interposer may be any suitable length (e.g., 5 centimeters to 50 centimeters).

FIG. 2B illustrates an example interposer 106. As seen in FIG. 2B, the interposer 106 is connected to the photonic IC 104 at one end of the interposer 106. Additionally, a connector 122 is connected to the opposite end of the interposer 106. The connector 122 is a ribbon connector that can accommodate several waveguides or conductors. The interposer may be any suitable length (e.g., 5 centimeters to 50 centimeters).

FIG. 2C illustrates an example interposer 106. As seen in FIG. 2C, the interposer 106 is connected to the photonic ICs 104 and 114 at opposite ends of the interposer 106. The interposer 106 carries electrical and/or optical signals between the photonic ICs 104 and 114. The interposer may be any suitable length (e.g., 5 centimeters to 50 centimeters).

Figure 3:
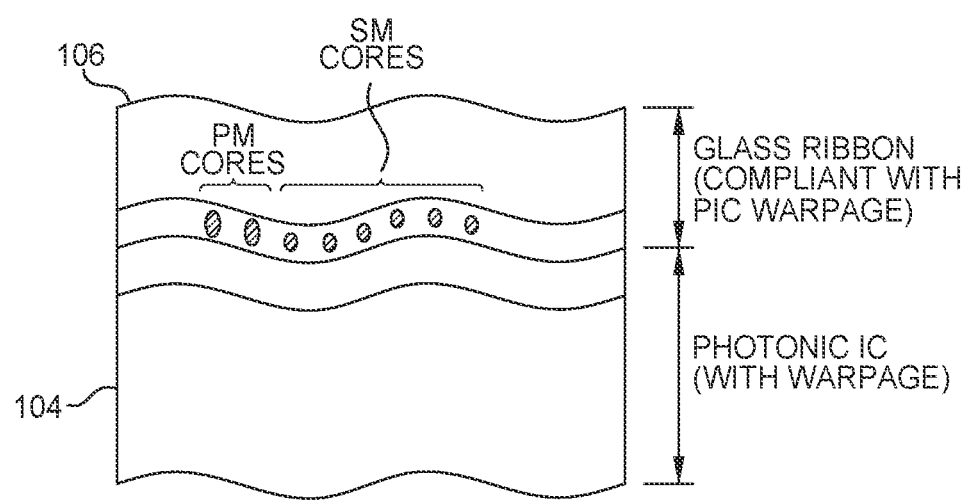
FIG. 3 illustrates an example connection between an interposer and a photonic integrated circuit.

FIG. 3 illustrates an example connection between the interposer 106 and the photonic IC 104. As seen in FIG. 3, the photonic IC 104 includes surface warpages or deformities. These surface warpages or deformities may be caused by human error or inaccuracies during manufacturing. As a result, these surface warpages or deformities may be different for different photonic ICs 104. Thus, the surface warpages or deformities may create curves in the surface of the photonic IC 104 that negatively impact the optical coupling with the photonic ICs 104 to different degrees.

The interposer 106 is formed using a flexible glass ribbon that elastically deforms to mate or couple with the photonic IC 104, despite the surface warpages or deformities. As seen in FIG. 3, the interposer 106 bends to conform to the shape of the surface of the photonic IC 104. As a result, the interposer 106 forms a closer and tighter coupling with the photonic IC 104.

Different types of optical waveguides may be disposed in the interposer 106. For example, single mode (SM), multimode (MM), and polarization maintaining (PM) waveguides may be disposed within the interposer 106. Additionally, single core fibers (SCFs) and MCFs may be disposed within the interposer 106. Combinations of different types of cores or fibers may be disposed within the interposer 106. The interposer 106 bends to conform to the curves in the surface of the photonic IC, which optically couples the various cores in the interposer 106 to the photonic IC 104. As a result, the interposer 106 provides a tighter optical coupling with the photonic IC 104 using any suitable types of optical waveguides. In some embodiments, the interposer 106 includes a flexible glass ribbon that allows for full three-dimensional waveguide routing within the ribbon, which provides a translation benefit from a 2D MCF to a 1D photonic IC interface.

Figure 4:
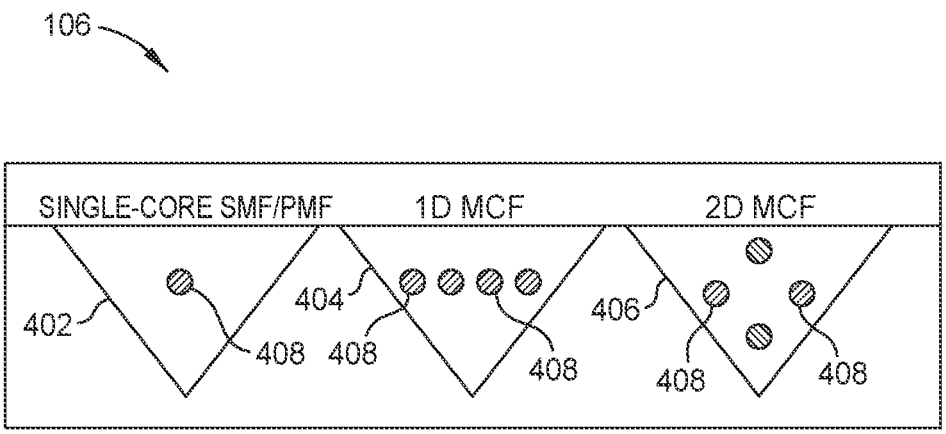
FIG. 4 illustrates an example end of an interposer.

FIG. 4 illustrates an example end of the interposer 106. As seen in FIG. 4, the interposer 106 includes grooves 402, 404, and 406 formed into the interposer 106. The grooves 402, 404 and 406 may be formed at an end of the interposer 106. One or more optical fibers may be disposed within the grooves 402, 404, and 406. As seen in FIG. 4, various fibers are disposed within the grooves 402, 404 and 406. Each of the fibers include one or more cores 408. For clarity, not all of the cores 408 are labeled in FIG. 4. A single core single mode fiber (SMF) or a single core polarization maintaining fiber (PMF) is disposed in the groove 402. A one-dimensional multicore fiber (1D MCF) is disposed in the groove 404. A two-dimensional multicore fiber (2D MCF) is disposed in the groove 406.

Additionally, as seen in FIG. 4, the grooves 402, 404, and 406 may be shaped and sized to mate or couple with corresponding grooves in a device connecting to the interposer 106. For example, the corresponding grooves may be formed on a surface of a photonic IC (e.g., by an interlayer dielectric of the photonic IC). The grooves 402, 404, and 406 mate with the corresponding grooves on the surface of the photonic IC to mate or couple the interposer 106 with the photonic IC. Additionally, mating the grooves 402, 404, and 406 with the corresponding grooves on the photonic IC may properly align the fibers disposed in the grooves 402, 404, and 406 with the photonic IC (e.g., so that the fibers optically couple with corresponding waveguides or fibers in the photonic IC).

Figures 5A, 5B:
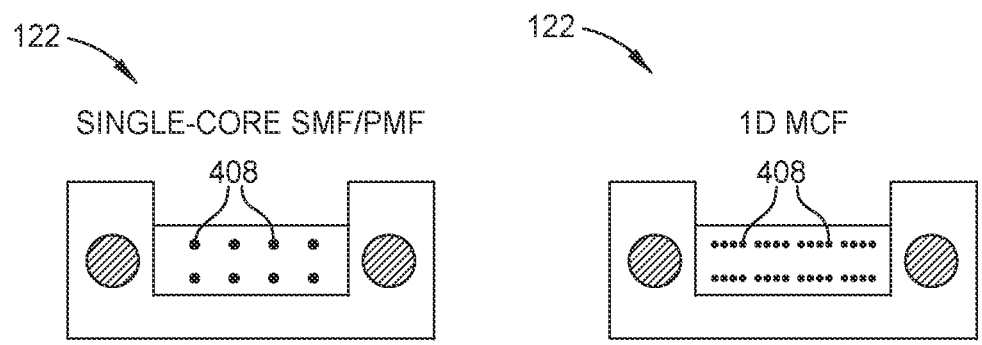
FIG. 5A illustrates an example end of an interposer.
FIG. 5B illustrates an example end of an interposer.

FIG. 5A illustrates an example connector 122. As discussed previously, the connector 122 may be connected to an end of the interposer 106. As seen in FIG. 5A, multiple fibers may extend from the interposer 106 through the connector 122 to connect the fibers to other devices connected to the connector 122. As seen in FIG. 5A, the cores 408 of multiple single core fibers (e.g., single core SMFs or single core PMFs) are disposed within the connector 122. For clarity, not all of the cores 408 have been labeled in FIG. 5A. The cores 408 may be arranged in a rectangular array to connect to a device connected to the connector 122.

FIG. 5B illustrates an example connector 122. In the example of FIG. 5B, the connector 122 connects multiple MCFs to a device connected to the connector 122. As seen in FIG. 5B, the cores 408 of the multiple 1D MCFs are disposed within the connector 122 in a rectangular array. The cores 408 extend through the connector 122 to connect to a device connected to the connector 122. For clarity, not all of the cores 408 are labelled in FIG. 5B.

Figure 5C:
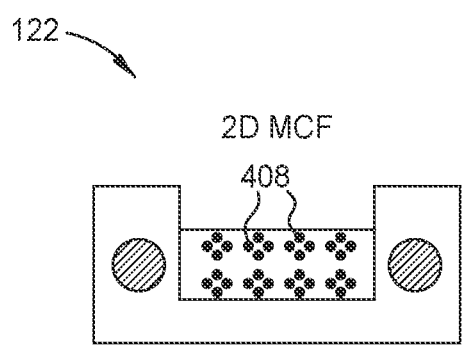
FIG. 5C illustrates an example end of an interposer.

FIG. 5C illustrates an example connector 122. As seen in FIG. 5C, the connector 122 accommodates multiple 2D MCFs. The cores 408 of the 2D MCFs are disposed in the connector 122, and extend through the connector 122 to connect to a device connected to the connector 122. For clarity, not all of the cores 408 in 5C are labeled.

Figure 6:
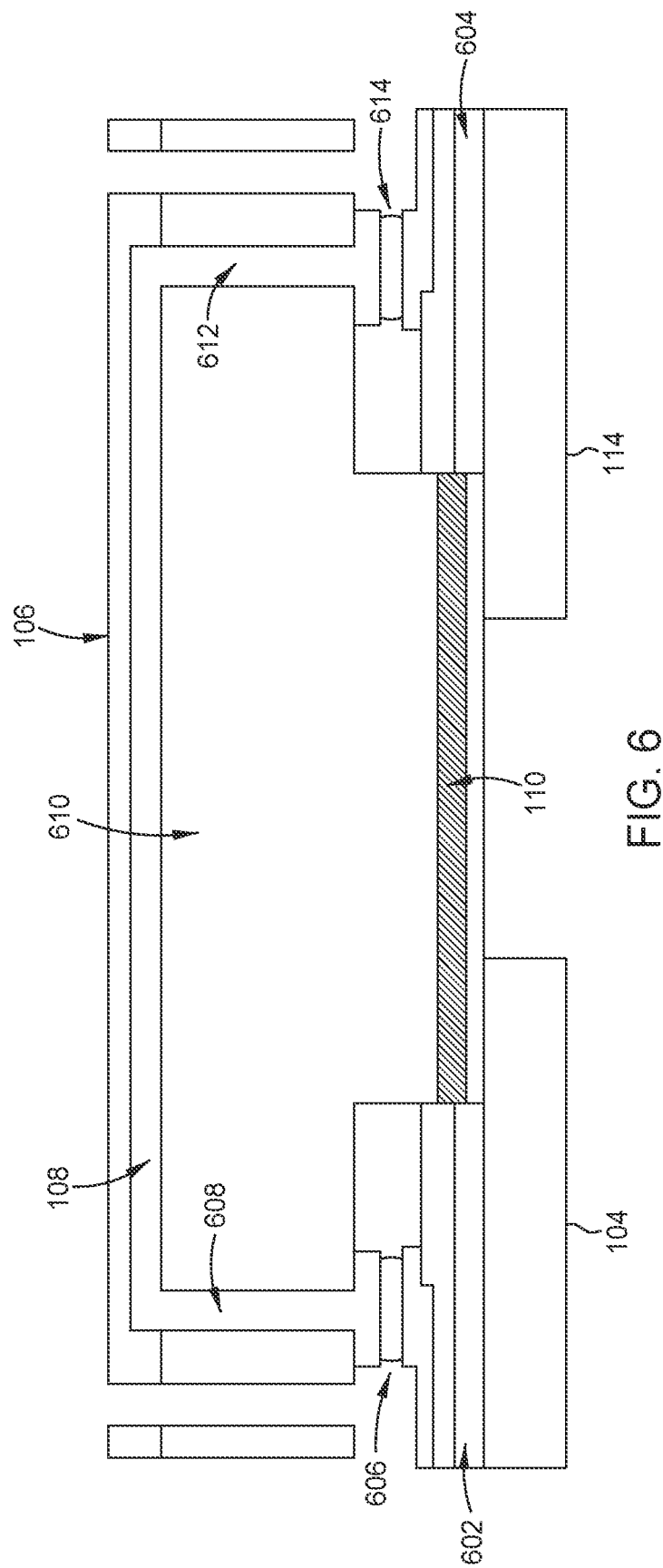
FIG. 6 illustrates an example connection between an interposer and a photonic integrated circuit.

FIG. 6 illustrates example connections between the interposer 106 and the photonic ICs 104 and 114. As seen in FIG. 6, the interposer 106 includes a flexible glass ribbon 610. The waveguide 110 is disposed within the flexible glass ribbon 610. The electrical conductor 108 is disposed in and on the flexible glass ribbon 610. The interposer 106 mates or connects to the photonic ICs 104 and 114 to carry optical and electrical signals between the photonic ICs 104 and 114.

The optical waveguide 110 is disposed in the flexible glass ribbon 610. As seen in FIG. 6, the optical waveguide 110 is positioned near the photonic ICs 104 and 114 when the interposer 106 is mated or connected to the photonic ICs 104 and 114. The optical waveguide 110 extends across the flexible glass ribbon 610 near a bottom surface of the flexible glass ribbon 610. The optical waveguide 110 carries an optical signal between the photonic ICs 104 and 114. For example, the optical waveguide 110 may communicate an optical signal through an interlayer dielectric 602 of the photonic IC 104 or an interlayer dielectric 604 of the photonic IC 114. The optical signal travels through the waveguide 110 and the interlayer dielectric 602 or 604 into the photonic ICs 104 or 114.

The electric conductor 108 is disposed in and on the flexible glass ribbon 610. As seen in FIG. 6, the electrical conductor 108 extends across a top surface of the flexible glass ribbon 610, parallel to the optical waveguide 110. The electrical conductor 108 may be laminated on the top of the flexible glass ribbon 610. The electrical conductor 108 extends down through the flexible glass ribbon 610 towards the photonic ICs 104 and 114. Through glass vias 608 and 612 are formed in the flexible glass ribbon 610. The electrical conductor 108 extends through the through glass vias 608 and 612 towards the photonic ICs 104 and 114. The electrical conductor 108 connects to electrical contacts 606 and 614 on the photonic ICs 104 and 114. For example, the electrical conductor 108 may be soldered to the electrical contacts 606 and 614 using solder bumps. In some embodiments, the electrical contacts 606 and 614 are positioned on the interlayer dielectrics 602 and 604. The electrical conductor 108 connects to the electrical contacts 606 and 614 to form an electrical connection with the photonic ICs 104 and 114. In this manner, the interposer 106 forms an electrical connection between the photonic ICs 104 and 114. As a result, the interposer 106 allows the photonic ICs 104 and 114 to communicate both optical and electrical signals between each other.

In some embodiments, an index matching fluid (e.g., optical epoxy) may be disposed between the flexible glass ribbon 610 and the interlayer dielectrics 602 and 604 and the photonic ICs 104 and 114 to establish or strengthen the optical coupling. Channels in the flexible glass ribbon 610 may assist with the flow of the index matching fluid when the index matching fluid is dispensed.

The flexible glass ribbon 610 may be formed from a flexible glass sheet or strip. The optical waveguide 110 may be written into the flexible glass ribbon 610 using laser writing. Reel-to-reel manufacturing may also be used to scale up the manufacturing of the interposer 106.

Lateral outlines in the photonic ICs 104 and 114 and the flexible glass ribbon 610 allow for passive lateral (X/Y) alignment. Vertical stop planes on the flexible glass ribbon 610 or the interlayer dielectrics 602 and 604 relative to the location of the optical waveguide 110 allow for passive Z alignment. The flexible glass ribbon 610 complies with the warped surface topologies of the photonic ICs 104 and 114 to align the optical waveguide 110 with the photonic ICs 104 and 114. Solder or epoxy may be used to fix the relative positions of the interposer 106 and the photonic ICs 104 and 114.

The interposer 106 improves the optical coupling with the photonic ICs 104 and 114 by ending or elastically deforming to conform to surface warpages or deformities that create curves in the surface of the photonic ICs. These warpages may result in optical loss and coupling loss. By using the interposer 106, the coupling loss may be reduced, in certain embodiments.

Figure 7A:
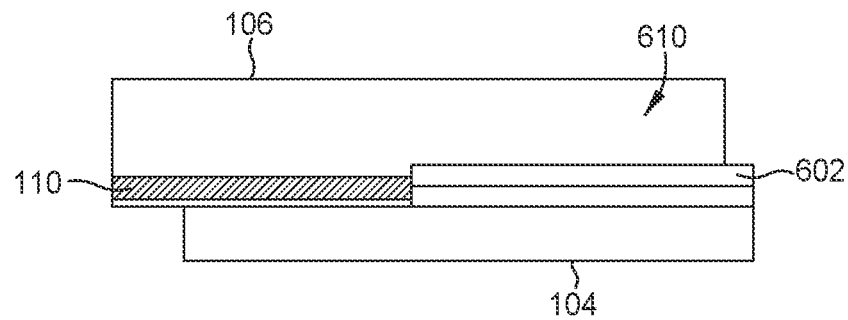
FIG. 7A illustrates an example connection between an interposer and a photonic integrated circuit.

FIG. 7A illustrates an example connection between the interposer 106 and the photonic IC 104. As seen in FIG. 7A, the interposer 106 is connected to the photonic IC 104 such that the optical waveguide 110 is edge coupled with the photonic IC 104. Specifically, the optical waveguide 110 is positioned near a bottom surface of the interposer 106, such that the waveguide 110 is positioned above the photonic IC 104 and adjacent to the interlayer dielectric 602. As a result, the optical signal exits the waveguide 110 and enters the interlayer dielectric 602 through a side surface of the interlayer dielectric 602. Alternatively, the optical signal exits the interlayer dielectric 602 through a side surface of the interlayer dielectric 602 and into the optical waveguide 110.

Figure 7B:
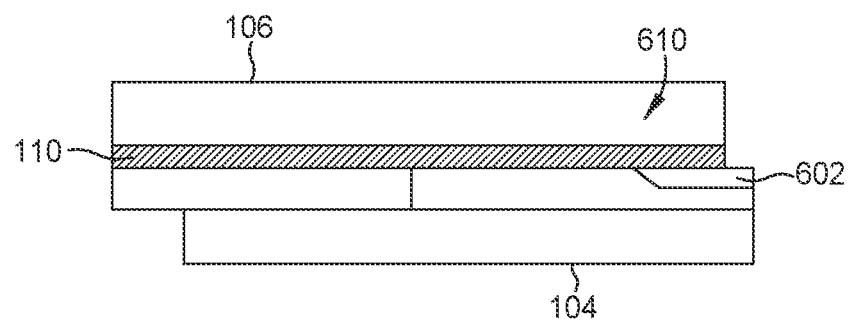
FIG. 7B illustrates an example connection between an interposer and a photonic integrated circuit.

FIG. 7B illustrates an example connection between the interposer 106 and the photonic IC 104. As seen in FIG. 7B, the interposer 106 is evanescently coupled with the photonic IC 104. The interposer 106 is structured such that the waveguide 110 is positioned above the photonic IC 104 and the interlayer dielectric 602 when the interposer 106 is coupled to the photonic IC 104. An optical signal travels through the waveguide 110 and exits the waveguide 110 and the interposer 106 through a bottom surface of the interposer 106. The optical signal then enters the interlayer dielectric 602 through a top surface of the interlayer dielectric 602. Alternatively, the optical signal travels through the interlayer dielectric 602 and exits the top surface of the interlayer dielectric 602. The optical signal then enters the waveguide 110 through a bottom surface of the interposer 106.

Figure 8:
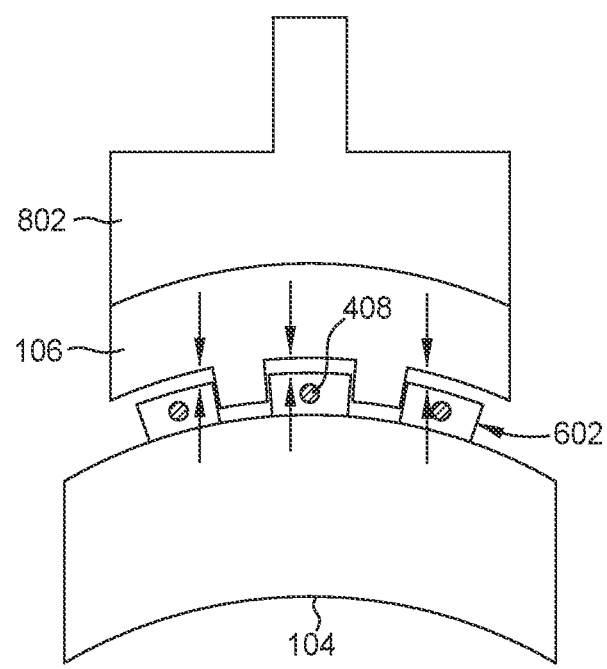
FIG. 8 illustrates an example connection between an interposer and a photonic integrated circuit.

FIG. 8 illustrates an example connection between the interposer 106 and the photonic IC 104. As seen in FIG. 8, the interposer 106 includes grooves that resemble teeth extending outwards from the interposer 106. Additionally, the photonic IC 104 includes one or more interlayer dielectrics 602 that extend from a top surface from the photonic IC 104. The teeth extending from the interposer 106 may interlock with the interlayer dielectric 602 extending from the photonic IC 104. This interlocking provides for a tighter coupling between the interposer 106 and the photonic IC 104. For example, the interlocking may prevent or resist the horizontal or lateral movements of the interposer 106 along the photonic IC 104. As a result, the interlocking of the teeth and the interlayer dielectric 602 provide for a better optical coupling between the interposer 106 and the photonic IC 104.

A pickup tool 802 may be used to grab or adhere to the interposer 106. The pickup tool 802 may then be used to position the interposer 106 over the photonic IC 104. For example, the pickup tool 802 may position the interposer 106 over the photonic IC 104 such that the teeth extending from the interposer 106 are positioned between the interlayer dielectric 602 extending from the photonic IC 104. Additionally, the pickup tool 802 may be used to decouple the interposer 106 from the photonic IC 104. For example, the pickup tool 802 may be positioned on the interposer 106 to grab or adhere to the interposer 106. The pickup tool 802 may then be lifted to decouple the interposer 106 from the photonic IC 104.

In summary, an interposer 106 includes an optical waveguide 110 disposed within a flexible glass ribbon 610. The ribbon 610 may deform to couple more closely with a photonic IC 104 with surface warpage or deformities caused by a manufacturing process. The ribbon 610 may include connectors 122 at an end of the ribbon 610 that helps mate the ribbon 610 and the waveguide 110 to a connector or another device. As a result, the ribbon 610 allows an optical waveguide 110 to be properly aligned with a photonic IC 104 when the photonic IC 104 has surface warpage or deformities that create curves in the surface of the photonic IC 104. Moreover, an electrical conductor 108 may also be disposed in the ribbon 610, which allows an electrical connection to be formed with a photonic IC 104 through the ribbon 610.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In view of the foregoing, the scope of the present disclosure is determined by the claims that follow.

We claim:

1. An apparatus comprising:
a ribbon comprising a first end, wherein the ribbon defines a first plurality of teeth positioned at the first end;
an optical waveguide disposed within the ribbon, wherein the optical waveguide terminates at the first end; and
an integrated circuit (IC) comprising a curved surface, wherein the IC defines a second plurality of teeth on the curved surface, wherein the first end of the ribbon bends to mate with the curved surface such that the optical waveguide is optically coupled to a corresponding waveguide in the IC, and wherein the first plurality of teeth interlock with the second plurality of teeth when the first end of the ribbon is mated with the curved surface of the IC.

2. The apparatus of claim 1, wherein the ribbon defines a groove formed in a second end of the ribbon opposite the first end and wherein the optical waveguide is disposed within the groove.

3. The apparatus of claim 1, further comprising an electric conductor disposed on the ribbon, wherein the ribbon defines a via, and wherein the electric conductor extends through the via to electrically couple to the IC.

4. The apparatus of claim 3, wherein a portion of the electric conductor extends parallel to the optical waveguide.

5. The apparatus of claim 1, wherein the optical waveguide is a polarization maintaining waveguide.

6. The apparatus of claim 5, further comprising a single mode waveguide disposed within the ribbon and at the first end, wherein the first end of the ribbon couples to the curved surface such that the single mode waveguide is optically coupled to the IC.

7. The apparatus of claim 1, wherein the optical waveguide is a multicore fiber.

8. The apparatus of claim 1, wherein the ribbon splits at a second end of the ribbon opposite the first end.

9. The apparatus of claim 1, wherein the ribbon is a flexible glass ribbon.

10. An apparatus comprising:
a flexible glass ribbon comprising a first end and a second end opposite the first end, wherein the flexible glass ribbon defines a first plurality of teeth positioned at the first end;
an optical waveguide disposed within the flexible glass ribbon, wherein the optical waveguide terminates at the first end;
an integrated circuit (IC) comprising a curved surface, wherein the IC defines a second plurality of teeth on the curved surface, wherein the first end of the flexible glass ribbon bends to mate with the curved surface such that the optical waveguide is optically coupled to the IC, and wherein the first plurality of teeth interlock with the second plurality of teeth when the first end of the flexible glass ribbon is mated with the curved surface of the IC; and
a connector coupled to the second end of the flexible glass ribbon, wherein the optical waveguide extends into the connector.

11. The apparatus of claim 10, wherein the flexible glass ribbon defines a groove formed in the second end and wherein the optical waveguide is disposed within the groove.

12. The apparatus of claim 10, further comprising an electric conductor disposed on the flexible glass ribbon, wherein the flexible glass ribbon defines a via, and wherein the electric conductor extends through the via to electrically couple to the IC.

13. The apparatus of claim 12, wherein a portion of the electric conductor extends parallel to the optical waveguide.

14. The apparatus of claim 10, wherein the optical waveguide is a polarization maintaining waveguide.

15. The apparatus of claim 14, further comprising a single mode waveguide disposed within the flexible glass ribbon and at the first end, wherein the first end of the flexible glass ribbon couples to the curved surface such that the single mode waveguide is optically coupled to the IC.

16. The apparatus of claim 10, wherein the optical waveguide is a multicore fiber.

17. The apparatus of claim 10, wherein the flexible glass ribbon splits at a second end of the flexible glass ribbon opposite the first end.

18. A system comprising:
a flexible glass ribbon comprising a first end and a second end opposite the first end, wherein the flexible glass ribbon defines a first plurality of teeth positioned at the first end;
an optical waveguide disposed within the flexible glass ribbon, wherein the optical waveguide terminates at the first end and at the second end;
a first photonic integrated circuit (IC) comprising a first curved surface, wherein the first photonic IC defines a second plurality of teeth on the first curved surface, wherein the first end of the flexible glass ribbon bends to mate with the first curved surface such that the optical waveguide is optically coupled to the first photonic IC, and wherein the first plurality of teeth interlock with the second plurality of teeth when the first end of the flexible glass ribbon is mated with the curved surface of the first photonic IC; and
a second photonic IC comprising a second curved surface, wherein the second end of the flexible glass ribbon bends to mate with the second curved surface such that the optical waveguide is optically coupled to the second photonic IC.

* * * * *